Jan. 12, 1960 K. FEDERN 2,920,498
LINKING DEVICE FOR MOVABLE PARTS
Filed March 17, 1954 3 Sheets-Sheet 1
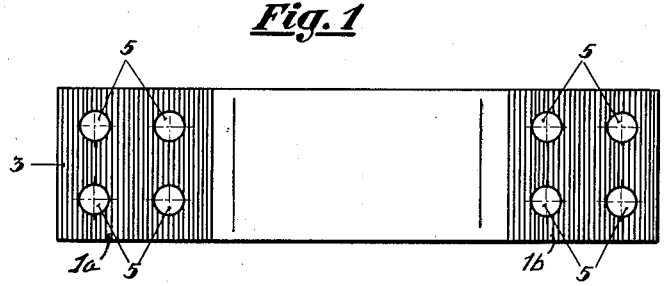
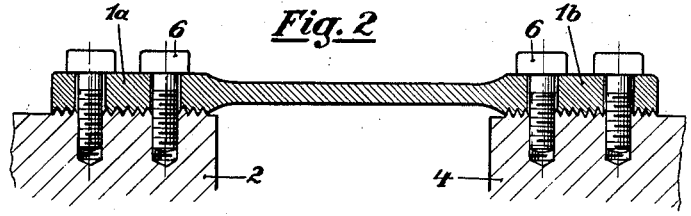
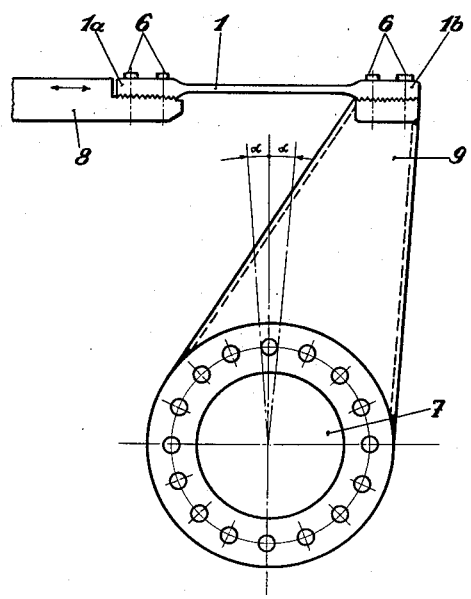

Jan. 12, 1960 K. FEDERN 2,920,498
LINKING DEVICE FOR MOVABLE PARTS
Filed March 17, 1954 3 Sheets-Sheet 2
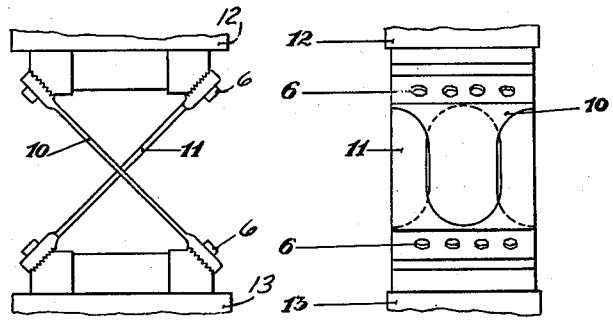

Jan. 12, 1960 K. FEDERN 2,920,498
LINKING DEVICE FOR MOVABLE PARTS
Filed March 17, 1954 3 Sheets-Sheet 3
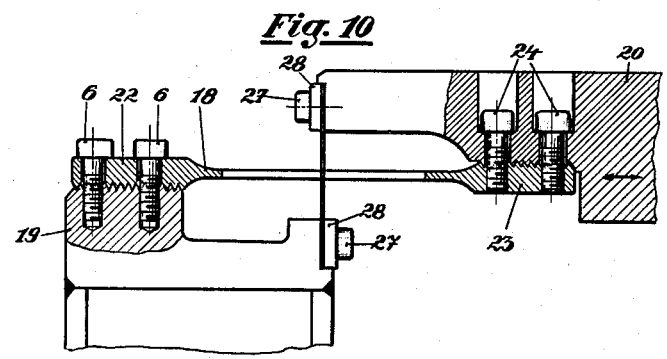
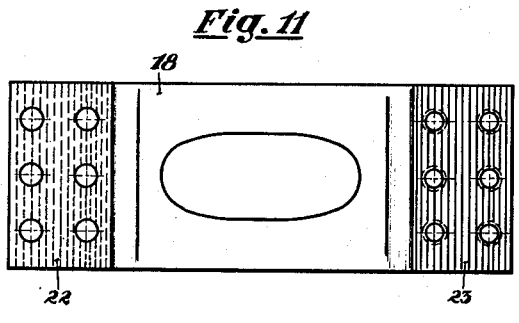
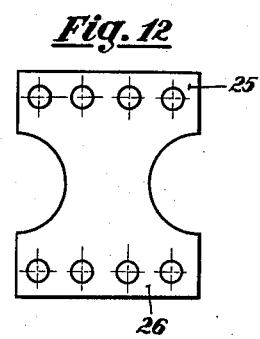
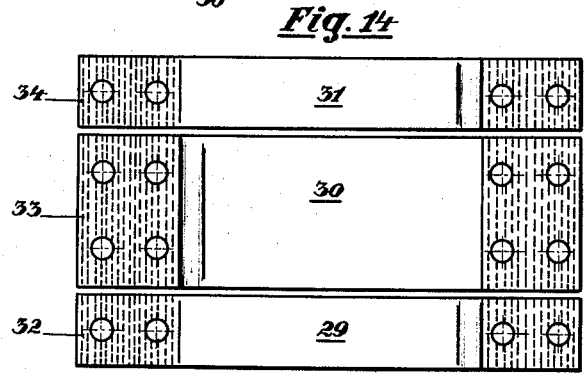
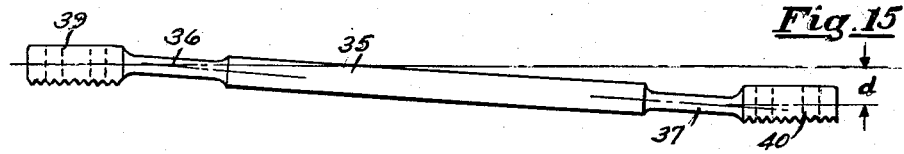

United States Patent Office 2,920,498
Patented Jan. 12, 1960

2,920,498

LINKING DEVICE FOR MOVABLE PARTS

Klaus Federn, Darmstadt, Germany, assignor to Carl Schenck Maschinenfabrik G.m.b.H., Darmstadt, Germany, a German corporation Application March 17, 1954, Serial No. 416,817

1 Claim. (Cl. 74—470)

My invention relates to a device for the interlinking of machine parts and more particularly to spring links for joints in oscillatory testing machines or mechanisms involving similar requirements.

The yielding articulations or pivotal linkages in oscillatory machines for the testing of materials are only rarely designed as pivot joints, ball joints, or knife-edge joints because machine elements of this kind, when subjected to alternating loads, are not so free of lost motion and wear as to secure the desired reliability and accuracy of operation. In oscillatory testing machines, particularly those operating on the resonance principle, it is therefore necessary to provide for articulated yieldability by utilizing the inherent elasticity of materials, that is by designing the articulated joints as bendingly flexible but axially stiff links. Such links may consist of simple leaf springs or spring bands or of a pair of bands arranged in crosswise relation to each other. Generally, such spring links have been found useful in all cases involving guided movements of linearly or rotationally reciprocating parts or the transmission of small forces. The modern tension-compression machines of the pulser type, balance analyzing machines, oscillation measuring devices and similar apparatus to operate with great accuracy would hardly be feasible without such spring links.

However, when larger values of force are to be transmitted, the application of spring links poses a serious problem. For securing a sufficient holding friction at the place where the spring is secured to the adjacent machine parts, a large surface beset with fastening screws is necessary. For accommodating a sufficient number of screws very much space is required, yet this frictional connection is not sufficiently secure, for instance, when subjected to impact or when given distances between pairs of pivot axes must be accurately maintained. Attempts have been made to use pin connections, fitted sleeves or force-fitted holding screws in conjunction with a sufficiently strong and large design of the head portions on the linking springs. Such designs, however, do not reduce the large space requirements. They also weaken the head portion of the spring, are expensive to manufacture and assemble, and are still inadequate for attaining the desired security.

It is an object of my invention to obviate the above-mentioned difficulties. To this end, I provide the clamping faces of the spring members and of the respective parts to be articulately joined thereby, with teeth or serrations of the same profile and the same tooth spacing. According to a more specific feature of the invention, the teeth or serrations on the clamping head of the spring band and on the adjacent machine part extend transverse to the longitudinal direction or load axis of the spring. In such a device, the forces acting upon the spring member are transmitted essentially by the meshing engagement of the respective groups of teeth in much the same manner as in the transmission of forces between a tensioning bolt and a nut in threaded engagement with the bolt. While with a spring band fastened in the conventional manner the clamping screws are required to withstand a shearing stress which is a multiple of the force longitudinally imposed upon the spring band, in most cases about 10 times that force, the force to be withstood by the clamping screws in a spring device according to the invention is very much smaller and in any event not larger than the longitudinal force in the spring band.

Still other objects, features and advantages of my invention will appear from the more detailed description set forth below, it being understood that the description is given by way of sample and explanation, and that various changes may be made by those skilled in the art without departing from the scope and spirit of the invention as set forth in the appended claims.

In the drawings, wherein like reference numerals denote corresponding parts throughout the several views:

Fig. 1 is a plane view of one embodiment of the resilient link according to the inventor;

Fig. 2 is a side view of the improved link shown in Fig. 1, illustrating particularly how it is secured between a pair of interlinked members;

Fig. 3 illustrates an application of the improved link comprising the invention;

Fig. 4 is a front elevational view of modified links according to the invention applied in crossing relation to the interconnected members to effect greater guiding forces;

Fig. 5 is a side elevational view of the linking arrangement illustrated in Fig. 4;

Fig. 6 is a side view of one of the resilient link members of Fig. 4;

Fig. 7 is a plan view of the link member shown in Fig. 6;

Fig. 8 is a side view of the other of the resilient link members of Fig. 4;

Fig. 9 is a plan view of the link member shown in Fig. 8;

Fig. 10 is a vertical view, partly in cross-section, of another modification of the invention;

Fig. 11 is a plan view of one of the link members shown in Fig. 10;

Fig. 12 is a plan view of the other of the link members shown in Fig. 10;

Fig. 13 illustrates in side elevation another construction and arrangement of resilient linking members according to the invention;

Fig. 14 shows in plan view the arrangement of Fig. 13; and

Fig. 15 is a side view of still another embodiment of the novel resilient link comprising the invention.

In Figs. 1 and 2 a spring band 1 forming the pivot joint between two interlinked parts 2 and 4 is provided with reinforced head portions 1a and 1b. The clamping faces of the head portions are provided with a group of transverse teeth or serrations 3. Each head portion, in this example, has four bores 5 for clamping bolts 6, which preferably consist of high-quality steel of great strength. The middle portion of the spring band preferably consists of high-strength steel or alloyed steel to withstand the unusually high stresses to which it is subjected. The teeth or serrations of the head portions 1a, 1b and complementary serrations of parts 2 and 4 are preferably designed in accordance with the standards applicable to ordinary screw threads. The head portions are given a greater thickness than the resilient middle portion, and the transitional structure between head portions and middle portion are given a curved or arcuate shape, as illustrated in Fig. 2, for most favorable stress transition.

With such design, the notching effect occurring in the serrations does not reduce the strength and useful life of the device. The ratios of width to thickness and length of the resiliently deformable spring band depend upon the magnitudes of the longitudinal forces to be transmitted and, in certain cases, also upon the bending angle $\pm\alpha$ (see Fig. 3) to be withstood by the linking device when in operation.

Fig. 3 represents a front view of an example of application of the new device. In this example the energy stored in a torsional spring 7 i.e. a torsionally oscillating shaft for example, is to be transmitted to a linearly reciprocable machine part 8. The angular deflection $\pm\alpha$ of an arm 9 securely mounted on the spring 7 is equal to the angle formed by the two head portions 1a and 1b of the spring link relative to each other when these head portions are in their respective end positions. The is, the angular deflection $\pm\alpha$ is equal to the bending angle to be withstood by the spring band 1. The ratio of the thickness of the spring band to the length of its elastic portion may amount to about 1:5 to 1:50.

When the parts to be joined by the spring band are not so guided that an S-shaped deflection of the spring band is safely prevented, then the spring link is to be designed as a spring cross. Especially compact is the design of such a cross link exemplified by Figs. 4 through 9. In this device the two mutually crossing spring bands 10 and 11 penetrate one another and interconnect the parts 12 and 13 by means of serrations and the fastening screws 6 in such a manner that, for small angular deflections, the parts 12 and 13 rotate relative to each other about a geometric axis formed by the line of intersection between the mutually inclined center planes of the spring bands. For small angles of deflection, cross links of this type can be of such size as not to occupy more space than a ball bearing. The two spring bands passing through each other may be of the particular design shown in Figs. 7 through 9. The band 10 has a recess 14 traversed by the band 11. If the recess 14 in band 10 is not large enough to permit passing the head portion 15 of band 11 therethrough, then the head portion 16 of band 10 must be given a longitudinal slit 17 at least equal to the thickness of the band as indicated by dotted lines in Fig. 7.

With an uneven number of spring bands the crosswise arranged bands may likewise be passed through each other according to Figs. 6 through 9. Crosswise arranged spring bands according to Figs. 4 and 5 may also be disposed in such a manner that the direction of the force to be transmitted forms with each of the two bands an angle of, for instance, 45° or 30°. The 45° arrangement is preferable when the cross arrangement of springs is to be loaded with longitudinal forces and transverse forces of approximately equal magnitudes.

For transverse forces of a lesser order of magnitude a design of the spring cross joint according to Fig. 10 may suffice to secure a proper bending deformation of the band 18 transmitting the main load. A machine part 19, for instance the end of a welded lever, to be articulately joined with a reciprocating part 20 is connected with that part by two spring bands 18 and 21. Band 18 has one head portion 22 fastened to part 19 by means of bolts 6, while the other head portion 23 of spring band 18 is secured to part 20 by bolts 24. Part 20 is to be reciprocated in the direction indicated by a double-headed arrow by the oscillatory movements of the lever end 19. In this embodiment the screw threads are directly cut into the head portion 23 of spring band 18. It will be noted that in this figure, and also Fig. 2, the shank of each bolt has longitudinal clearance with respect to one of the elements it joins together. In Fig. 2, this clearance is with respect to the head portions of the strip 1. The crosswise arranged spring band 21 serves for transmitting the smaller transverse forces and for securing accurate maintenance of the desired geometrical pivot axis. The head portions 25 and 26 of this spring are not provided with teeth or serrations because of the smaller force to be transmitted for which the clamping pressure of the bolts 27 acting through cover plates 28 is sufficient.

Spring bands crossing each other at an angle of 60° or 90° require several machined clamping faces at the parts to be joined. The simplified design according to Figs. 13 and 14 is of advantage wherever the transverse forces are small and where the cross arrangement serves only to prevent S-shaped bending or a displacing of the theoretical axis of rotation. Two spring bands 29 and 30, (or the three bands 29, 30 and 31, as illustrated in Fig. 14), are inclined to such a slight degree that clamping faces 32, 33, 34 all extending in a common plane are permissible. For symmetry, the application of three spring bands of different width instead of two bands of equal width is often preferable. In cases where serrations extending transverse to the load direction can not be provided on the head portions of the spring bands, a longitudinal group of teeth or serrations may already secure sufficient advantages. With a 60° inclination of the teeth flanks, the surface engagement for a given clamping pressure is doubled so that only one half of the space is needed in comparison with flat (i.e. not serrated) head portions.

The foregoing explanations relating to spring bands with only one elastic portion of reduced cross section are analogously applicable to spring bands with two elastic portions of reduced cross section that are located in the vicinity of the two respective head portions and are separated from each other by a middle portion of larger cross section serving to increase the stiffness of the device. In such devices the two elastic portions near the respective ends can be subjected not only to angular displacements between the two head portions but also to displacements of the head portions transverse to their direction of alignment. Such displacements of the respective axes of the head portions occur with swinging machine parts when one of the parts to be interconnected is moved on a circle in parallel relation to itself while the other part is constrainedly guided for movement along a linear path. Fig. 15 shows such a spring band having a middle portion 35 and two elastic portions 36 and 37 and having non-aligned head portions 39 and 40 displaced in parallel relation to each other by a distance $d$. The head portions 39 and 40 are serrated and have bores for the passage of fastening bolts as described previously. The two elastic portions 36 and 37 are deformed approximately along a circular arc. The middle portion 35 of the device remains almost rigid and undeformed during the oscillatory deflections imparted to the spring device.

I claim:

A torsion apparatus comprising two parts to be connected, said parts being subject to forces conferring angular displacement with respect to each other, one part being rigidly connected to a torsion member, means linking the two parts comprising a spring member stiff in the longitudinal direction thereof, said member comprising a flat metal strip having longitudinally spaced flat head portions of greater thickness than a portion thereof intermediate the head portions, the intermediate portion flaring at its longitudinal ends symmetrically in smooth curves, to join the head portions, said intermediate portion being resilient to bending force, each of said head portions and said parts to be connected having matching serrations comprising outwardly tapering teeth extending transversely of the spring member and in meshing engagement with each other when said spring member is firmly secured to said parts, the teeth having a depth such that the remaining thickness of the respective head portion is at least as great as the thickness of the intermediate portion, and fastening bolts entering the parts and head portions for drawing the teeth surfaces against each other, the shanks of each of said bolts having longitudinal clearance with respect to one only of the respective head portion and part which that bolt holds, the end face of each head portion being free of stress application, whereby the longitudinal stress is mainly upon said meshing teeth, said metal strip having in its intermediate portion a longitudinally extended aperture, a second flat spring metal strip passing through said aperture, said second spring metal strip having an intermediate flat portion which portion extends within said aperture substantially at a right angle to the flat surface of the first mentioned metal strip, said second spring metal strip being fastened to said two parts on surfaces of the latter which extend at right angles to the first mentioned metal strip.

References Cited in the file of this patent

UNITED STATES PATENTS

| | | |
|---|---|---|
| 392,241 | Van Allen | Nov. 6, 1888 |
| 392,617 | Lieb et al. | Nov. 13, 1888 |
| 428,612 | Hutchinson | May 27, 1890 |
| 591,690 | Ponkney | Oct. 12, 1897 |
| 777,838 | Card et al. | Dec. 20, 1904 |
| 914,504 | Parrish | Mar. 9, 1909 |
| 1,041,609 | Emery | Oct. 15, 1912 |
| 1,231,110 | Abercrombie | June 26, 1917 |
| 1,425,834 | Brown | Aug. 15, 1922 |
| 1,508,097 | Hassler | Sept. 9, 1924 |
| 1,699,707 | Mitchell | Jan. 22, 1929 |
| 1,791,122 | Cronkhite | Feb. 3, 1931 |
| 2,160,012 | Botsford | May 30, 1939 |
| 2,408,512 | Gradisar | Oct. 1, 1946 |
| 2,499,981 | Strobel | Mar. 7, 1950 |
| 2,647,398 | Marvel | Aug. 4, 1953 |
| 2,778,232 | Mork | Jan. 22, 1957 |

FOREIGN PATENTS

| | | |
|---|---|---|
| 11,724 | Great Britain | July 6, 1916 |
| of 1915 | | |
| 16,721 | Germany | Jan. 3, 1882 |
| 342,415 | Great Britain | Feb. 5, 1931 |
| 641,432 | Great Britain | Aug. 9, 1950 |
| 1,028,323 | France | Feb. 25, 1953 |